(12) United States Patent
Crespo et al.

(10) Patent No.: US 6,960,299 B2
(45) Date of Patent: Nov. 1, 2005

(54) TREATMENT OF AQUEOUS MEDIA CONTAINING ELECTRICALLY CHARGED COMPOUNDS

(75) Inventors: João Goulão Crespo, Lisboa (PT); Marla d'Acensão Miranda Reis, Lisboa (PT)

(73) Assignee: Intstituto De Biologia Experimental E Technologia, Oeiras (PT)

(*) Notice: Subject to any disclaimer, the term of this patent is extended or adjusted under 35 U.S.C. 154(b) by 405 days.

(21) Appl. No.: 10/149,469

(22) PCT Filed: Dec. 4, 2000

(86) PCT No.: PCT/PT00/00012

§ 371 (c)(1),
(2), (4) Date: Sep. 9, 2002

(87) PCT Pub. No.: WO01/40118

PCT Pub. Date: Jun. 7, 2001

(65) Prior Publication Data

US 2003/0057162 A1 Mar. 27, 2003

(30) Foreign Application Priority Data

Dec. 6, 1999 (PT) .................................... 102385

(51) Int. Cl.[7] .................................................. C02F 3/00
(52) U.S. Cl. ....................................... 210/610; 210/631
(58) Field of Search ................................. 210/610, 631

(56) References Cited

U.S. PATENT DOCUMENTS 4,988,443 A * 1/1991 Michaels et al. ........... 210/611

FOREIGN PATENT DOCUMENTS

| DE | 19513565 | 9/1996 |
| GB | 2 249 785 | 5/1992 |
| WO | WO 93/06045 | 4/1993 |

* cited by examiner

*Primary Examiner*—Chester T. Barry
(74) *Attorney, Agent, or Firm*—Marshall, Gerstein & Borun LLP

(57) ABSTRACT

This invention provides a method of reducing the concentration of at least one electrically charged compound present in aqueous feedstock (5), such as water and waste water. The feedstock to be treated is continuously supplied to one surface of a selectively permeable, electrically charged membrane (2) contained within a module (1). Simultaneously an aqueous reaction medium, containing an active microbial culture, contacts with the opposite face of the membrane (2). The microbial culture, fed with selected nutrients and salts, is capable to convert at least one electrically charged compound, after it permeates through the wall of the membrane (2) to by-products. The membrane is substantially impermeable to electrically uncharged compounds. The ion-exchange properties of the membrane allow avoiding secondary pollution of the treated water by metabolic by-products and residual nutrients from the reaction medium. The membrane separates physically the polluted water stream (5) from the reaction medium, which assures that the treated water (6) does never directly contact with the microbial culture.

15 Claims, 5 Drawing Sheets

TREATMENT OF AQUEOUS MEDIA CONTAINING ELECTRICALLY CHARGED COMPOUNDS

Figure 1:
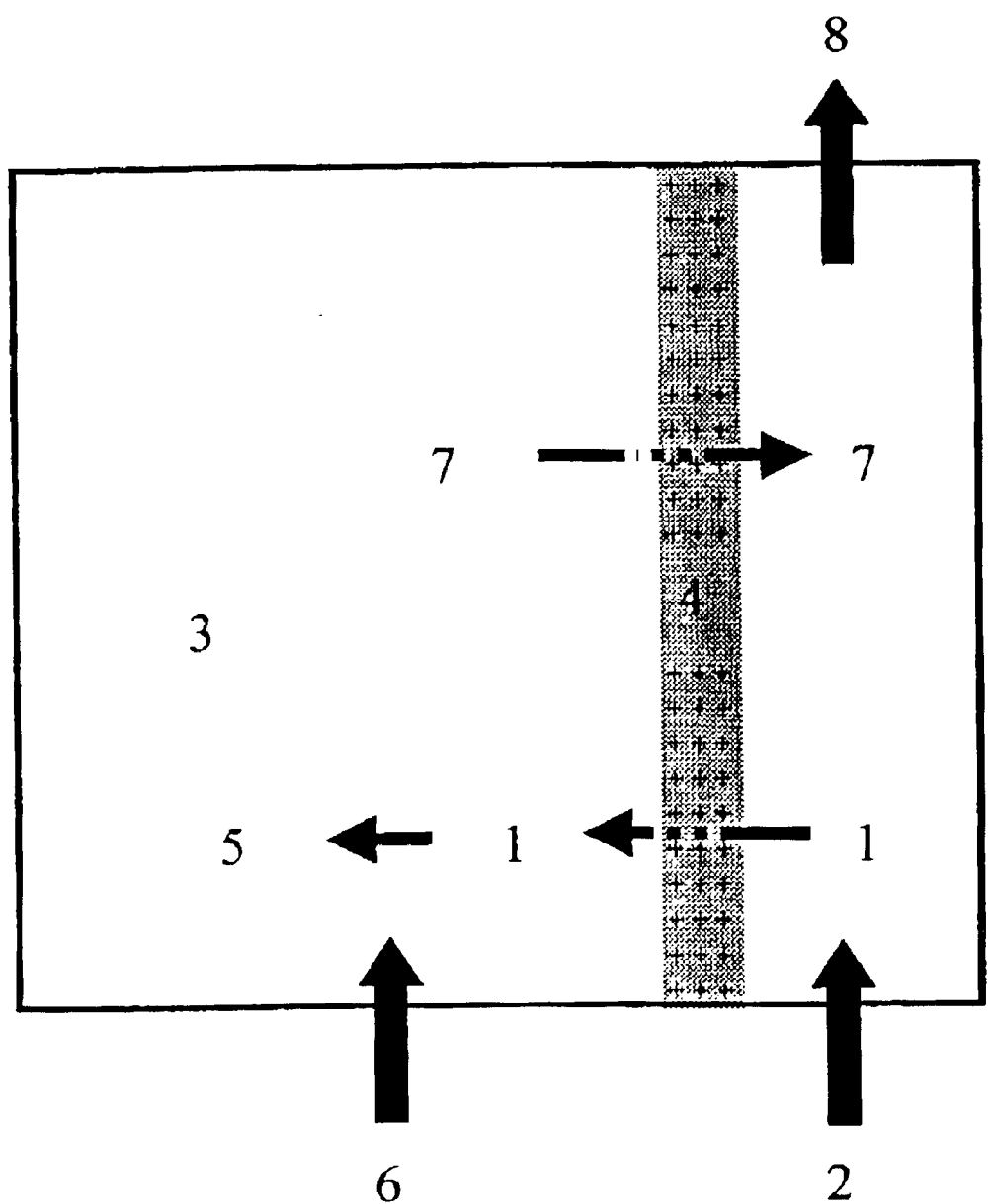

This invention is concerned with methods for treatment of aqueous media which contain electrically charged compounds which are to be biologically decomposed into less environmental polluting by-products.

The present invention has principal application on the treatment of water and waste waters contaminated with electrically charged pollutants, which are extracted from the aqueous media and biologically transformed into less harmful by-products prior to be distributed or discharged.

In many regions of the world water supplies and waste waters are contaminated with ions namely anions such as, for example, nitrate, nitrite, perchlorate, sulphate and bromate as well as with cations such as, for example, ammonium, chromium and mercury.

Most of the electrically charged pollutants present a potential risk to the public health and to the environment. Environmental directives stipulate treatment of these aqueous streams in order to reduce pollutants concentration to below a maximum value before discharge into the environment or use as a water supply. Standards regulations are particularly restrictive for drinking water where the main concern is public health.

Several treatment processes have been described for removal of ionic compounds from water streams with varying degrees of efficiency, cost and simplicity of operation. The most common technologies described are ion exchange, membrane separation and biological processes (Kapoor, A. and Viraraghavan, T. J., Environ. Eng. 123, 371–380, 1997). Ion exchange treatment (using ion exchange resins or Donnan dialysis) is an attractive alternative but the most important concern over its use is the disposal of the spent regenerated brine containing the concentrated ionic pollutants extracted, requiring an additional pos-treatment in order to degrade the pollutant completely. In the field of membrane assisted technologies, main attempts have been focussed on the use of reverse osmosis and electrodialysis. However, in addition to their high capital and operational costs, both methods were found to be very sensitive towards presence of even small amounts of colloidal particles and organic ions that can cause severe membrane fouling (Fell C. J. D., Membrane Separations Technology. Principles and applications, edited by Noble R. D. and Stern S. A., Elsevier Science, Amsterdam, 1995, Strathtmann H., Membrane Separations Technology. Principles and Applications, edited by Noble R. D. and Stern S. A., Elsevier Science, Amsterdam, 1995). Biological processes are based on the ability of microorganisms to convert pollutants to final products, which are less harmful to the environment or to the public health. In biological processes the pollutant is decomposed into less environmental polluting by-products while, when using physical/chemical technologies, the pollutants are not eliminated but simply concentrated in waste streams that require further treatment.

The benefits of the use of biological processes are highly recognized. Most traditional techniques use bioreactors where a direct contact between microorganisms, nutrients and the water stream containing the pollutant to be degraded is promoted. Consequently the treated water stream becomes necessarily contaminated with microbial cells, metabolic by-products and residual nutrients (organic and inorganic) not consumed during the process, which contributes to a secondary pollution of the treated water. While microbial contamination of the treated water can be avoided by using microfiltration or ultrafiltration membrane bioreactors, small and soluble secondary pollutants are not retained by porous membranes and, therefore, secondary pollution is not prevented. Exclusion of metabolic by products from treated water is critical because it reduces the formation potential of disinfection by-products. A hybrid process for nitrate removal from drinking water was recently developed. This process combines, in two separate steps, ion exchange followed by biological treatment of the concentrated brine produced in the first step. However, during operation, both chemical and microbial fouling were observed which led to a loss of efficiency of the ion exchange column and to decrease of the microbiological quality of treated water. Membrane contactor systems were proposed to overcome secondary pollution and microbial contamination problem. In these systems, microporous membranes (McCleaf, P. R., Schroeder, E. D., J. AWWA, 5, 77–86, 1995) or membrane and agar immobilized cell composites (Lemoine, D., Jouenne, T., Junter, G. A., Appl. Microbial Biotechnol., 36, 257–264, 1991) separate the culture from the water stream to be treated. Bench scale results revealed that microporous contactors were not sufficient to prevent pollution of treated water by incompletely degraded substrates and microorganisms. Livingston (EP 0 604 514 B1) reported the use of hydrophobic membranes to extract organic compounds from aqueous feedstock to a biological medium where the pollutant is decomposed to harmless by-products. In this system microbial contamination of the treated water is avoided; however this process is only effective for treatment of water streams contaminated with hydrophobic organic compounds and cannot be applied to the removal and degradation of electrically charged pollutants.

It is from knowledge of the disadvantages associated with conventional methods of treating water and waste water contaminated with electrically charged compounds that has led to the present invention.

The invention provides methods of reducing the concentration of at least one electrically charged pollutant present in an aqueous feedstock, wherein a flow of said feedstock contacts one surface of a selectively permeable, electrically charged membrane, whose permeability to said at least one electrically charged compound exceeds its permeability to electrically uncharged compounds, whilst simultaneously maintaining in contact with the opposite surface of said membrane an aqueous reaction medium containing biologically active microorganisms, fed with nutrients and salts, capable of reacting with said at least one electrically charged compound after it permeates through the membrane.

The aqueous feedstock preferably comprises water or waste water which is contaminated with at least one electrically charged compound. Several electrically charged compounds, negatively or positively charged, may be present and this method may be employed to reduce the concentration of more than one electrically charged compound present.

Preferably the compound(s) comprise inorganic ions and these compound(s) may be anions such as, for example, nitrate, nitrite, perchlorate, sulphate, cyanide and bromate as well as cations such as, for example, ammonium, chromium and mercury. However, organic ions can also be treatable in the present method.

The aqueous feedstock may also contain one or more organic compounds as well as colloidal material and suspended solids.

The permeability characteristics of the selective membrane result from its ion-exchange properties. A membrane with positively charged groups, commonly denominated as cationic membrane, is able to exchange and transport ions with opposite charge (negative charge) while presenting a high resistance to the transport of ions with the same charge (positive charge) and to uncharged compounds. An anionic membrane will perform in the opposite way. It facilitates the transport of positively charged ions and it hinders the permeation of negatively charged ions and of uncharged compounds.

There are various materials of which the membrane may be comprised. The membrane may comprise polymeric or inorganic materials, or comprise both polymeric and inorganic materials. The membrane has to present ion-exchange properties. It is preferred to use non-porous, dense phase membranes. Non-porous membranes are membranes that, under observation by electron scanning microscopy, do not present observable porous.

The membrane may be flat or have a tubular geometry. The membrane may have a flat geometry such as in the case of using plate-and-frame modules, spiral-wound modules, and rotational membrane modules, amongst others. The membrane may have a tubular geometry such as in the case of hollow fibre modules, capillary fibre modules, and tubular membrane modules, amongst others.

The reaction medium is preferably water containing biologically active microorganisms, able to transform the said ionic compound(s) by single or multisequential reactions into products which are non toxic to the environment or which permeation across the membrane, into the treated water stream, is highly hindered. Nutrient compounds are essential to sustain growth and activity of the microorganisms responsible for carrying out the reaction(s) of transformation of the ionic pollutant(s). Nutrient compounds may comprise both inorganic and organic compounds. Nutrients may be supplied in the said aqueous reaction medium in order to replenish them along the time course of the process. The aqueous reaction medium can be supplied continuously or in a fed-batch or batch mode.

The microbial culture responsible for the transformation of the ionic pollutant(s) in the aqueous reaction medium may be a single or mixed culture of microorganisms. A single culture includes only one species of active microorganisms. A mixed culture contains more than one species of active microorganisms. An effective mixed culture may be obtained by previously exposing a non-specific mixed culture to a medium containing the ionic pollutant(s) to be transformed. The microbial culture to be used in this invention may also consist in a pure or mixed culture of genetically modified microorganisms.

It is preferred that the aqueous feedstock is supplied and replenished continuously in order to contact with one surface of the selectively permeable membrane whilst, simultaneously, the aqueous reaction medium contacts with the opposite side of the membrane. Using this procedure the ionic pollutant(s) present in the aqueous feedstock, with opposite charge to that of the selective membrane, permeate(s) across it to the aqueous reaction medium. The driving force for transport of the electrically charged pollutant(s) through the membrane is provided by the biological conversion of these compounds by the microbial culture within the reaction medium. Selected anions, such as chloride and bicarbonate, amongst others, may be added to the aqueous reaction medium in order to intensify the transport of negatively charged pollutants from said aqueous feedstock, through the membrane, to the reaction medium. Identically, cations such as sodium and potassium, amongst others, may be added to the aqueous reaction medium in order to intensify the transport of positively charged pollutants. Batch or fed-batch supply of said aqueous feedstock is also possible within the scope of this invention.

In the embodiments of the invention, the aqueous reaction medium may be contained within one or more, separate, controlled environment bioreactor(s) which is (are) fed from the membrane. Additionally, when using one or more bioreactor(s), it (they) may be submitted to controlled oscillating conditions such as, for example, oscillations of nutrient(s) concentration, oscillation of dissolved oxygen concentration, oscillation of redox potential, oscillation of pH and oscillation of temperature. The composition of the aqueous reaction medium and the environmental conditions to be controlled in the bioreactor(s) are defined according to the microbial culture(s) involved.

Figure 2:
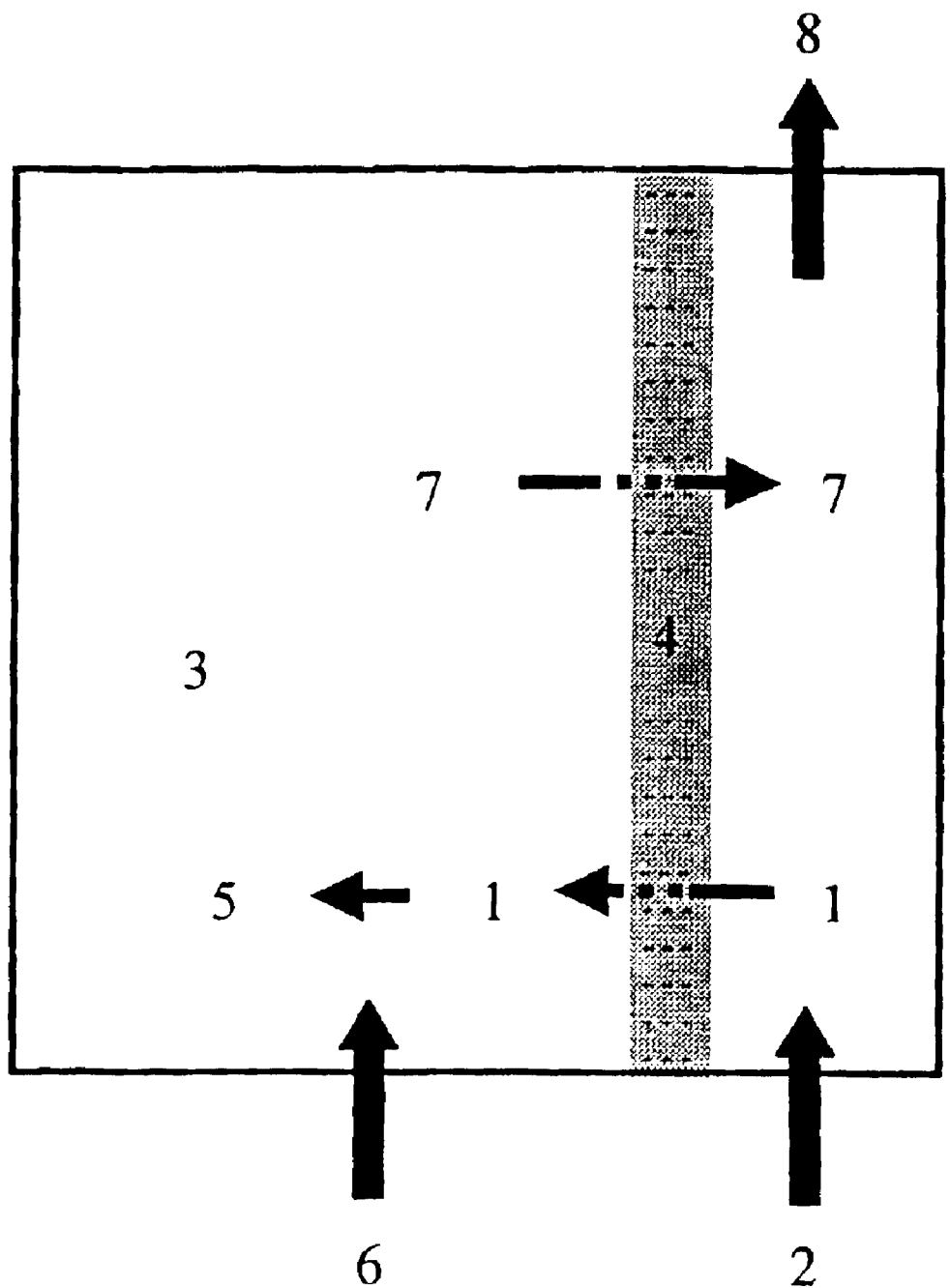
Figure 3:
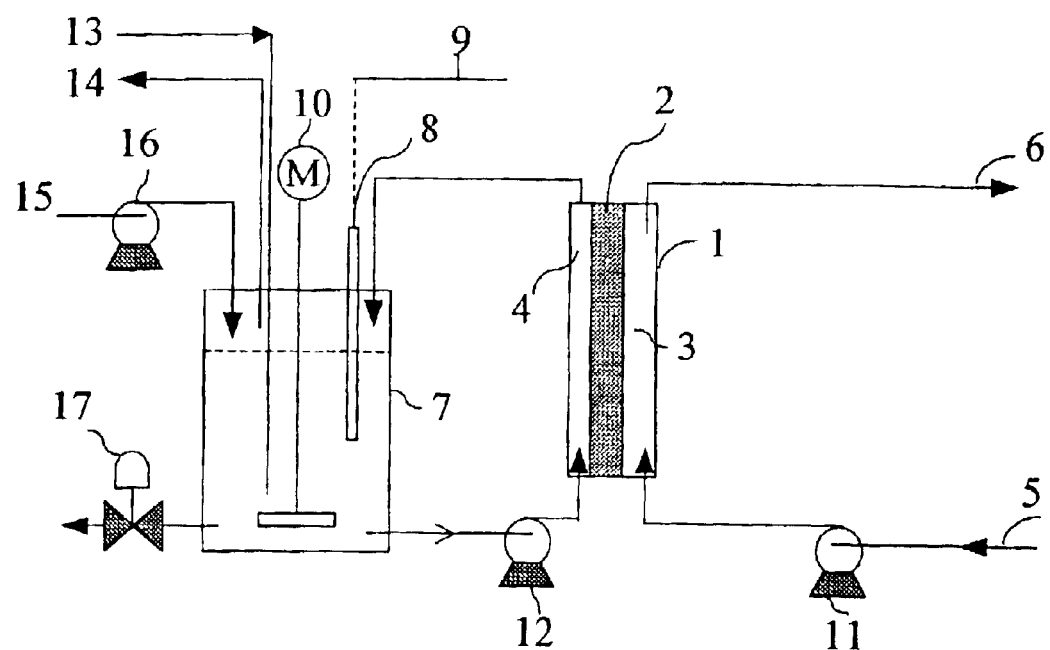
Figure 4:
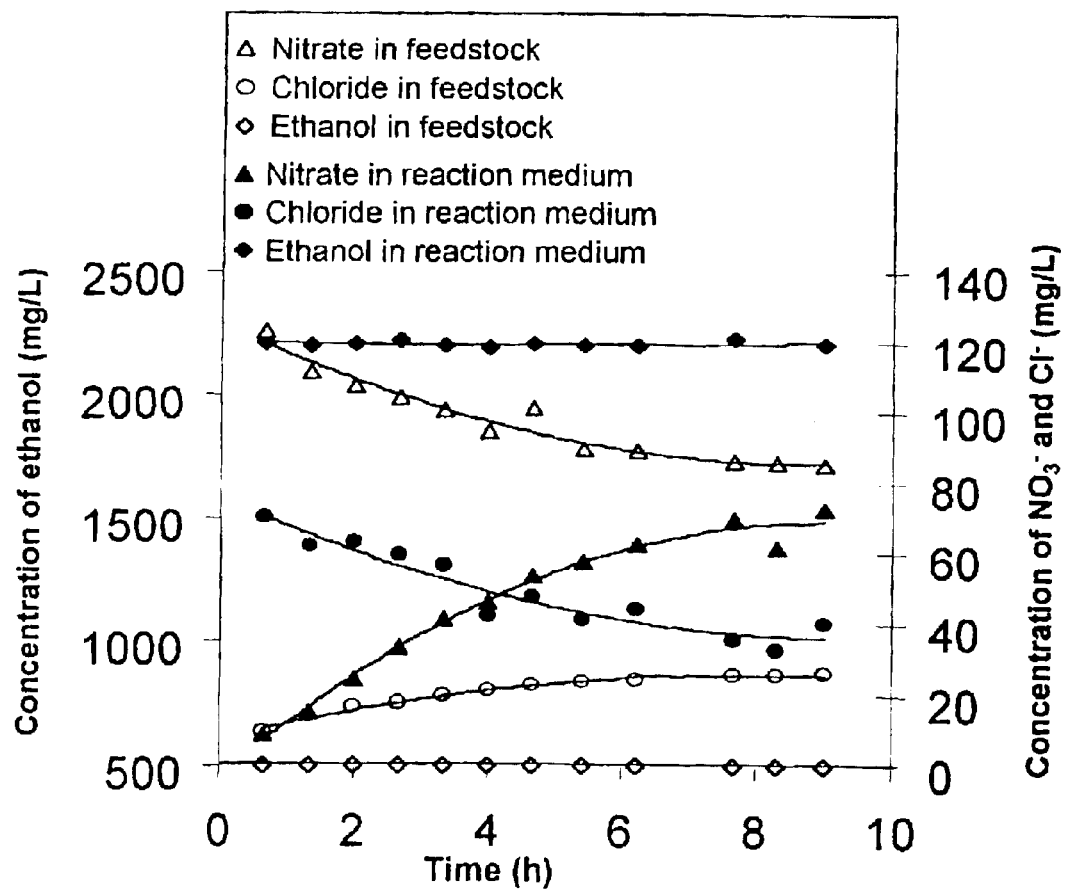
Figure 5:
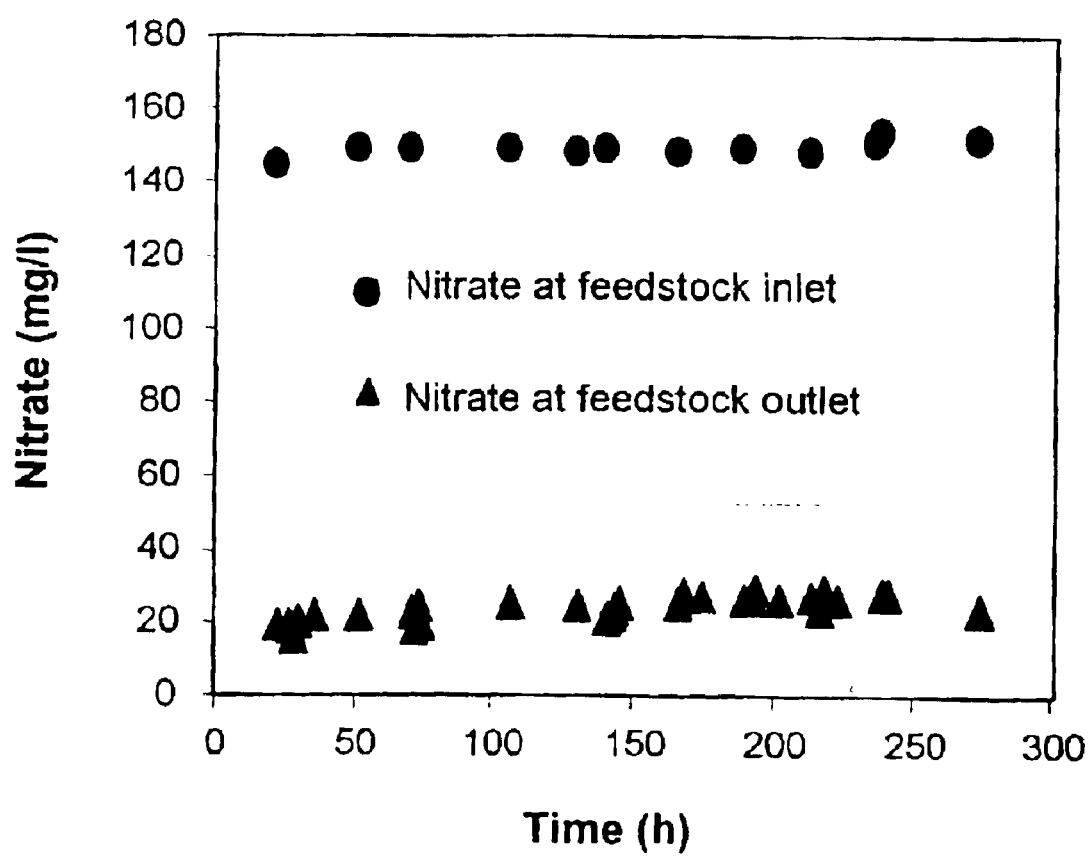

In order that the invention may be more easily understood and readily carried into effect, embodiments thereof are now described by way of non-limiting example only, in the accompanying drawings wherein:

FIG. 1 illustrates the general principle of transport and biodegradation of negatively charged compounds, FIG. 2 illustrates the general principle of transport and biodegradation of positively charged compounds, FIG. 3 represents a scheme of the present invention, comprising a membrane module and a remote bioreactor supplied with liquid recycling means, FIG. 4 is a graph representing nitrate transport across the membrane, chloride transport across the membrane in opposite direction to that of nitrate, and ethanol impermeability through the membrane, as a function of time, FIG. 5 is a graph representing inlet nitrate concentration in the aqueous feedstock and its outlet concentration in the treated aqueous feedstock as a function of time.

Referring to the drawings, FIG. 1 illustrates the transport of a negatively charged pollutant 1 from the aqueous feedstock 2 to the aqueous reaction medium 3, through a membrane 4 with positively charged groups (cationic membrane), followed by conversion of the negatively charged pollutant, by a microbial culture, to metabolic by-products 5. The membrane is substantially impermeable to the metabolic by-products formed. It is preferred that nutrients fed in the fresh aqueous reaction medium 6, such as carbon and nitrogen sources, do not permeate through the membrane, from the reaction medium to the aqueous feedstock. Additionally, selected anion(s) 7 may be added to the aqueous reaction medium in order to intensify the transport of the target pollutant(s). This (these) anion(s) is (are) transported through the membrane in opposite direction to that of the pollutant(s). The concentration of this (these) anion(s) at the outlet of the treated feedstock stream 8 must be compatible with the standards defined by legislation.

FIG. 2 illustrates the transport of a positively charged pollutant 1 from the aqueous feedstock 2 to the aqueous reaction medium 3, through a membrane 4 with negatively charged groups (anionic membrane), followed by conversion of the positively charged pollutant, by a microbial culture, to metabolic by-products 5. The membrane is substantially impermeable to the metabolic by-products formed. It is preferred that nutrients fed in the fresh aqueous reaction medium 6, such as carbon and nitrogen sources, do not permeate through the membrane, from the reaction medium to the aqueous feedstock. Additionally, selected cation(s) 7 may be added to the aqueous reaction medium in order to intensify the transport of the target pollutant(s). This (these) cation(s) is (are) transported through the membrane in opposite direction to that of the pollutant(s). The concentration of this (these) cation(s) at the outlet of the treated feedstock stream 8 must be compatible with the standards defined by legislation.

The system represented in FIG. 3 is particularly intended for the continuous treatment of water or waste water containing electrically charged pollutants. The FIG. 3 arrangement shows a membrane module 1 comprising two independent compartments physically separated by an ion-exchange membrane 2. The aqueous feedstock containing the pollutant(s) 5 is continuously fed with a pump 11 through compartment 3 where the said aqueous feedstock contacts with one side of the membrane. The electrically charged pollutant(s) is (are) transferred from the aqueous feedstock, across the membrane, to the reaction medium where it (they) is (are) converted by the active microbial culture, and the treated feedstock stream 6 leaves the membrane module. The apparatus represented in FIG. 3 comprises also a bioreactor receptacle 7 which may be equipped with probes for measurement of parameters such as, for example, pH, dissolved oxygen concentration, redox potential and temperature, and corresponding actuators such as, for example, pH control device, dissolved oxygen control device, redox potential control device and temperature control device. The apparatus represented in FIG. 3 includes a pH probe 8 and the corresponding control device 9. The bioreactor receptacle may be stirred by a mechanical stirrer 10. The aqueous reaction medium, containing the active microbial culture, is recirculated from the bioreactor receptacle by means of pump 12 to compartment 4 of the membrane module, where said reaction medium contacts with the membrane surface opposite to the membrane surface in contact with the aqueous feedstock The bioreactor receptacle may include a gas entrance 13, and corresponding sparging device, and a gas outlet 14. Fresh aqueous reaction medium 15, containing nutrients and salts, may be continuously fed to the bioreactor receptacle by pump 16 and withdraw through valve 17.

FIG. 4 exemplifies the transport performance of a selected ion-exchange membrane of cationic type to be applied for biological denitrification of water using the above described system. FIG. 4 shows that the concentration of nitrate in an aqueous feedstock decreases as a function of time and simultaneously increases in the receiving solution, which is the aqueous reaction medium without active microbial culture, while the chloride anion used as a counter-ion to intensify the transport of nitrate, is transported in opposite direction to that of nitrate. Ethanol, typically used as a carbon and energy source by microorganisms able to convert nitrate into molecular (gaseous) nitrogen, is not able to permeate the membrane during operation, has can be concluded from its constant concentration in the aqueous medium as well as in the aqueous feedstock FIG. 5 illustrates the performance of the above described system for biological denitrification of water using an ion-exchange membrane of cationic type. Under continuous operation the nitrate concentration in the aqueous feedstock was reduced, by an active denitrifying microbial culture, from an average value of 150 mg of nitrate per litre to an average value of 25 mg of nitrate per litre. The maximum allowed value for nitrate concentration in drinking water supplies is 50 mg of nitrate per litre.

The main advantages of using the present invention in biological treatment of aqueous media containing one or more electrically charged compounds are the following: biological conversion assures an effective degradation of the pollutant and not only its accumulation in a concentrated stream, has happens in physical processes; the ion-exchange membrane separates physically the polluted water stream from the reaction medium, which assures that the treated water does never directly contact with the microbial culture; the ion-exchange properties of the membrane allow to avoid secondary pollution of the treated water by metabolic by-products and residual nutrients from the reaction medium; the transfer of the pollutant from the aqueous feedstock to the reaction medium is enhanced by reduction of its concentration due to bioconversion.

What is claimed is:

1. A method of reducing the concentration of at least one electrically charged compound present in an aqueous feedstock, comprising the steps of:
   continuously supplying a flow of said aqueous feedstock and contacting with one surface of a selectively permeable, electrically charged membrane, whose permeability to said at least one electrically charged compound exceeds its permeability to electrically uncharged compounds,
   simultaneously maintaining in contact with the opposite surface of said membrane an aqueous reaction medium provided within a bioreactor receptacle or proceeding from it,
   the aqueous reaction medium containing biologically active microorganisms, fed with nutrients and salts, and reacting with said at least one electrically charged compound after it permeates through the membrane, and wherein said membrane is substantially impermeable to electrically uncharged compounds and to compounds with electric charge of opposite sign to said membrane.

2. A method as claimed in claim 1 wherein the aqueous feedstock comprises water or waste water which contains at least one electrically charged compound, which can either be an anion or a cation.

3. A method as claimed in claim 2 wherein the anions present in the aqueous feedstock are nitrate, nitrite, perchlorate, sulphate, cyanide or bromate, and the cations present in the aqueous feedstock are ammonium, chromium or mercury.

4. A method as claimed in claim 1 wherein biologically active culture of microorganisms in an aqueous reaction medium contact one surface of said membrane while the aqueous feestock comprising at least one electrically charged compound contacts the opposite side of said membrane, assuring that said aqueous reaction medium and the aqueous feedstock do never physically contact directly.

5. A method as claimed in claim 1 wherein the aqueous feestock contains one or more salts, acids or bases.

6. A method as claimed in claim 1 wherein selected ions are added to the aqueous reaction medium in order to intensify the transport of electrically charged compounds from said aqueous feedstock, through the membrane to the reaction medium.

7. A method as claimed in claim 6 wherein select ions are chloride, bicarbonate, sodium or potassium.

8. A method as claimed in claim 1 using one or more bioreactor receptacles having independently controllable aqueous reaction environments.

9. A method as claimed in claim 8 wherein the controllable parameters of the aqueous reaction environment(s) are nutrient(s) concentration, dissolved oxygen concentration, redox potential, pH and temperature.

10. A method as claimed in claim 1 wherein the membrane is electrically charged with anionic groups or with cationic groups.

11. A method as claimed in claim 10 wherein the membrane is polymeric or inorganic or comprises both polymeric and inorganic materials.

12. A method as claimed in claim 10 or 11 wherein the membrane is selectively permeable to monovalent ions or to multivalent ions.

13. A method as claimed in claim 1 wherein said membrane has a tubular geometry or a flat geometry.

14. A method as claimed in claim 13 wherein the membrane with tubular geometry is provided in a hollow fibre module, in a capillary fibre module, or in a tubular membrane module, and the membrane with flat geometry is provided in a plate-and-frame module, in a spiral-wound module, or in a rotational membrane module.

15. A method as claimed in claim 14 wherein the membrane module(s) is (are) submersed in one or more bioreactor receptacle(s) or placed externally to the bioreactor receptacle(s).

* * * * *

UNITED STATES PATENT AND TRADEMARK OFFICE
CERTIFICATE OF CORRECTION

PATENT NO. : 6,960,299 B2
APPLICATION NO. : 10/149469
DATED : November 1, 2005
INVENTOR(S) : Joao Goulao Crespo et al.

It is certified that error appears in the above-identified patent and that said Letters Patent is hereby corrected as shown below:

Title Page
Column 1, Line 1
Field (73) Assignee:

Please delete "Intstituto" and replace with --Instituto--.

Title Page
Column 1, Line 2
Field (73) Assignee:

Please delete "Technologia" and replace with --Tecnologia--.

In the Claims:

Claim 4
Column 7, line 4    Please delete "wherein biologically" and replace with --wherein a biologically--.

Claim 4
Column 7, line 6    Please delete "contact" and replace with --contacts--.

Claim 4
Column 7, line 7    Please delete "feestock" and replace with --feedstock--.

Claim 5
Column 7, line 12   Please delete "feestock" and replace with --feedstock--.

Claim 6
Column 7, line 16   Please delete "through the membrane" and replace with --through the membrane,--.

UNITED STATES PATENT AND TRADEMARK OFFICE
CERTIFICATE OF CORRECTION

PATENT NO. : 6,960,299 B2
APPLICATION NO. : 10/149469
DATED : November 1, 2005
INVENTOR(S) : Joao Goulao Crespo et al.

It is certified that error appears in the above-identified patent and that said Letters Patent is hereby corrected as shown below:

Claim 7
Column 7, line 18    Please delete "select" and replace with --selected--.

Signed and Sealed this

Fourteenth Day of November, 2006

JON W. DUDAS
*Director of the United States Patent and Trademark Office*